United States Patent Office 3,377,787
Patented Apr. 16, 1968

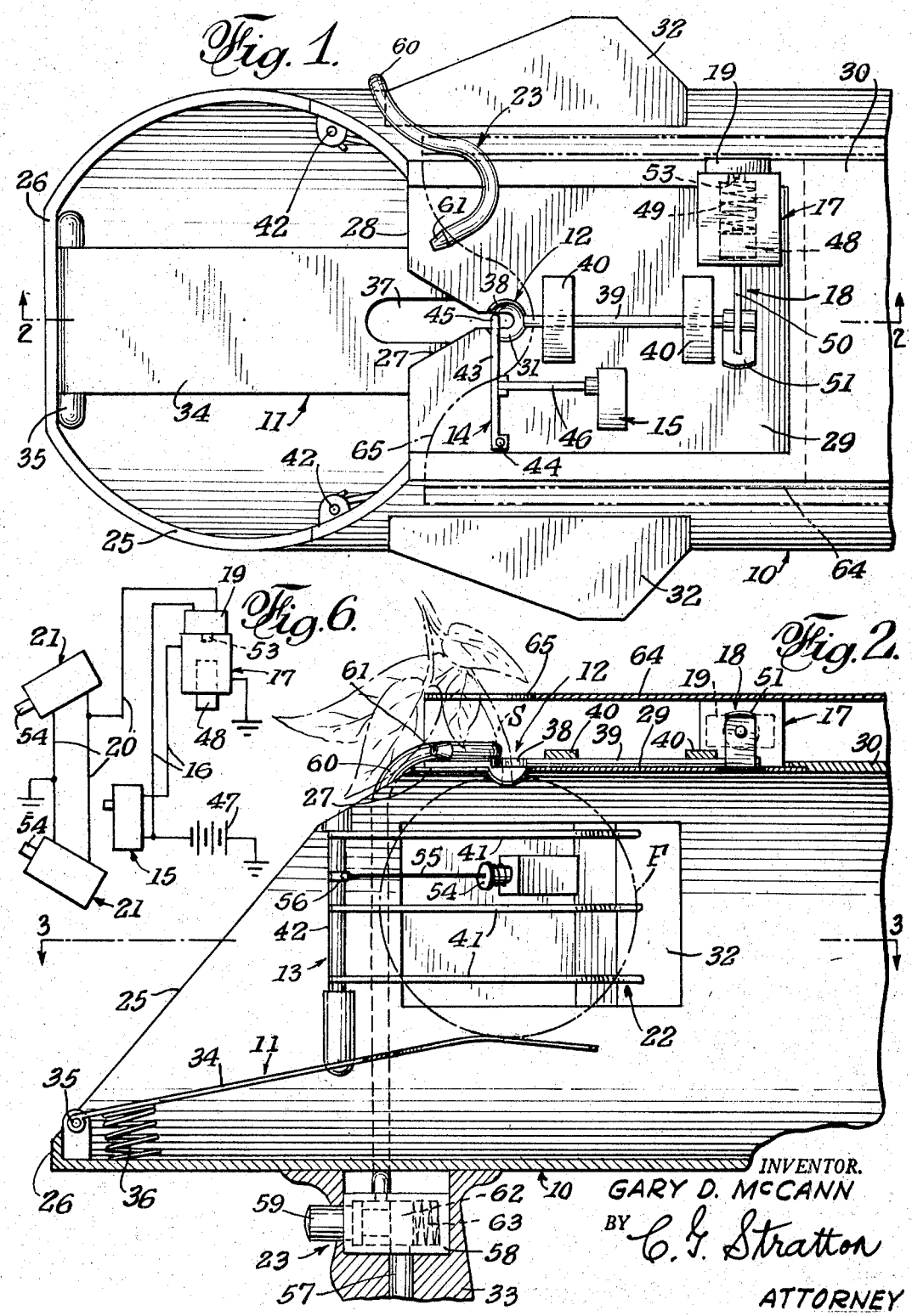

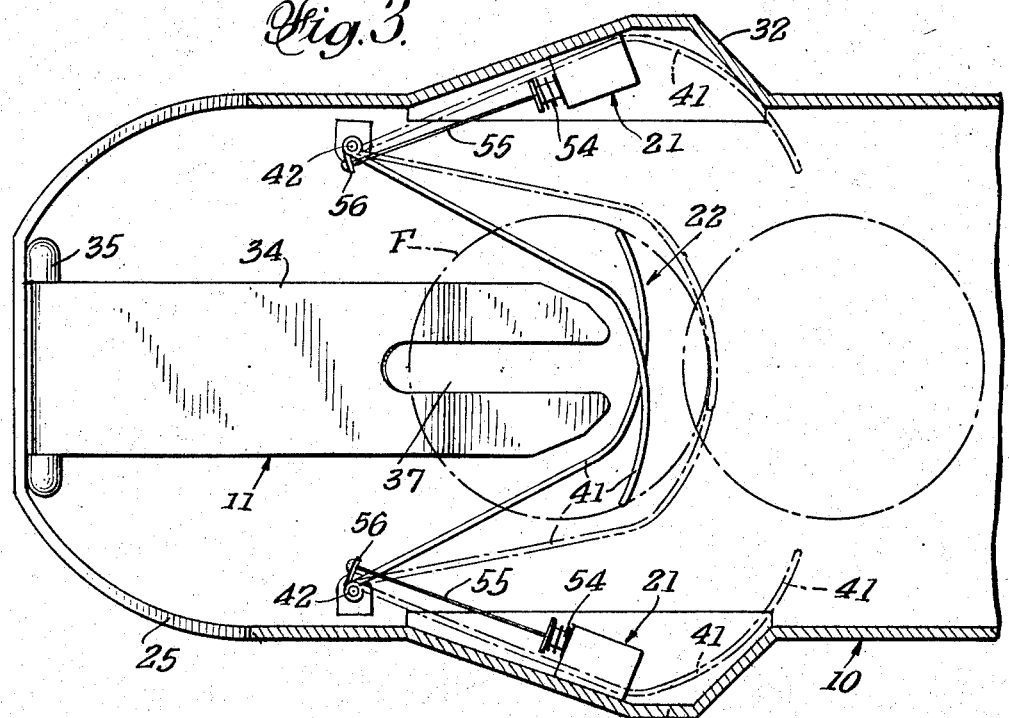
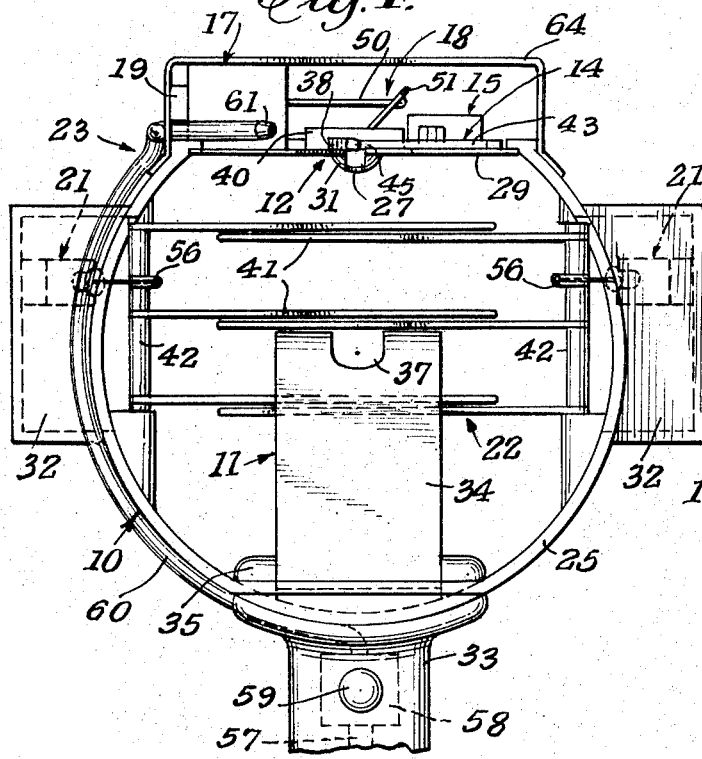
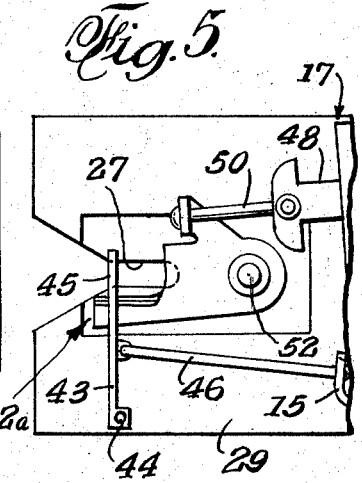

3,377,787
AUTOMATIC FRUIT PICKER HEAD
Gary D. McCann, Los Angeles, Calif.
(2455 E. Chevy Chase Drive, Glendale, Calif. 91206)
Filed May 17, 1965, Ser. No. 456,134
9 Claims. (Cl. 56—328)

ABSTRACT OF THE DISCLOSURE

A fruitpicker head having a tube with an open end for receiving fruit, a longitudinal leadin slot extending longitudinally from said end and into which the stems of pieces of fruit enter as the fruit enters the tube, stem-severing means carried by the tube, and means engaged by the stem, as it moves into the slot, to operate said severing means.

---

This invention relates to an automatic fruitpicker head for harvesting fruit by cutting through the stems thereof and receiving the same in a conduit that conducts them to a collecting receptacle.

An object of the invention is to provide a picker head formed to guide the fruit thereinto and so centering the fruit that the stems thereof are guided to a cutter that is automatically operated by the stems during entering movement into the head.

Another object of the invention is to provide a picker head, as characterized, that cuts the stems close to the fruit whether or not the fruit has dimples or clefts from which the stems extend.

A further object of the invention is to provide a picker head that centers the fruit and resiliently biases the same toward the stem cutter irrespective of the fruit size.

A still further object of the invention is to provide a picker head, as charatcerized, that includes means to keep the stem-cutting area of the head clear of foliage that is adjacent to the fruit being picked.

This invention also has for its objects to provide such means that are positive in operation, convenient in use, easily installed in a working position and easily disconnected therefrom, economical of manufacture, relatively simple, and of general superiority and serviceability.

The foregoing objects are realized in a picker head construction that comprises a rigid tube which has an end edge that is sloped at an angle to the axis of the tube, the rearward portion of said edge having a leadin notch for guiding the stem of a piece of fruit that enters the tube. A lever in the path of the stem is actuated thereby and closes a switch in the electric circuit of a solenoid which, when energized, actuates a cutter that severs the stem. Resilient means biases the fruit in a direction toward the cutter so that the stem is cut as close to the fruit as is practicable. Means to center the fruit as it enters the tube helps guide he stem thereof to cuting posiion and retains the fruit in cutting position. The cutter soelnoid, when energized, has its armature close a switch in the electric circuit to a pair of solenoids which, when energized, opens the fruit-retaining means to free the fruit to move, whether by gravity or by suction applied to the tube, toward a collecting receptacle. The area in the vicinity of the cutter is kept clear of foliage by means of a jet or jets of compressed air that are advantageously controlled by a push button operable by a finger of the hand that grasps a pistol grip on which the tube is mounted.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a top plan view of the end of a fruitpicker head according to the present invention.

FIG. 2 is a longitudinal sectional view as taken on the line 2—2 of FIG. 1. 4

FIG. 3 is a longitudinal sectional view as taken on the line 3—3 of FIG. 2.

FIG. 4 is an end view of said head.

FIG. 5 is a fragmentary plan view of a modified form of stem cutter.

FIG. 6 is a wiring diagram.

The fruitpicker head that is illustrated comprises, generally, a fruit-receiving tube 10, means 11 mounted in said tube adjacent its forward end for resiliently biasing fruit entering the tube in a direction toward cutter means 12, fruit-centering means 13 within the tube between the means 11 and the cutter means 12, means 14, acuated by the stem of the fruit, to close a switch 15 in an electric circuit 16 to a solenoid 17, means 18 operated by the solenoid to move the cutter means 12 in a stem-cutting operation, a switch 19 closed by the armature of said solenoid, when the latter is energized, to close an electric circuit 20 to a pair of solenoids 21, gate means 22 in the path of a piece of fruit in the tube 10 connected to the solenoids 21 and operated to open a path for the fruit by said solenoids 21, when energized, and means 23 to apply a jet or jets of air to the stem-cutting area to clear away foliage.

The tube 10 is formed to have a sloping edge 25 that extends from a lip 26 rearwardly to a leadin notch 27 in the forward edge 28 of a plate 29 that is fitted to the flattened top 30 of the tube. A semispherical embossment 31 is formed in plate 29, the leadin notch 27 extending to the center thereof. On both sides of the tube 10, are formed outwardly directed bulges 32 designed to house the solenoids 21 and allowing spaces for the gate means 22 when the same are opened to release harvested fruit. A pistol grip 33 is affixed to the lower part of the tube 10 as a handle by means of which the operator may manipulate the tube to present the open end to fruit to harvest the same.

The means 11 is shown as a slightly bent finger 34 that is mounted on a horizontal pivot 35, extends inwardly from the lip 26 of the tube 11, and is biased upwardly by a spring 36. Said finger is provided, at its inner end, with a longitudinal slot 37. Said finger 34 lightly presses on the bottom of a piece of fruit F as the same approaches a position in which the stem cleft receives the depression 31, as shown in FIG. 2, and the stem S of said piece of fruit moves into the closed end of the leadin slot 27. The lower end of the fruit, usually with a roughened flower end, has the same extending into the slot 37 so friction with the finger 34 is minimized. The fruit is thereby centered as the same approaches the gate means 22.

The cutter means 12 is shown as a curved blade 38 on the end of an axle 39 journaled in bearings 40. The axle extends longitudinally along the top of the plate 29, the same being on an axis that intersects the curvature of the depression 31. The blade 38 has the same curvature.

Thus, when the axle is turned the blade 38 sweeps the depression, across the slot 27, and severs a stem S in said slot.

The fruit-centering means 13 is in the form of a double gate, the same comprising inwardly oppositely curved and horizontal wire fingers 41 carried on vertical pivots 42 on opposite sides of the tube 10. Said fingers 41 are interlaced to form a resilient barrier to fruit until the stem has been severed.

This means 14 is shown as a lever 43 that is mounted on plate 29 on a pivot 44 and has its free end 45 in the path of the stem S, and a link 46 extending from said lever to the switch 15, it being clear that movement of lever 43 by a stem S will cause closing of the switch 15 under actuation by the link 46. The circuit 16 is thus closed between a current source 47 and the solenoid 17, resulting in retraction of the armature 48 of said solenoid against the projecting bias of the spring 49.

The means 18 interconnects the solenoid armature 48 and the axle 39 and is shown as a link 50 connected to said armature, as a lever 51 on the axle and connected to said link. Retraction of the armature 48 causes the blade 38 to cut a stem S, as hereinbefore described.

In the modification of FIG. 5, which may be used for fruits that do not have clefts or dimples and may have protuberances from which the stems extend, the link 50 swings a blade 12a, on a pivot 52, across the leadin slot 27, it being understood that the fruit bears against the flat bottom of plate 29.

The armature 48 has its inner end directed toward the actuator 53 of the switch 19. Therefore, the stem-severing operation is immediately followed by a closing of switch 19 and of the circuit 20 and energization of the solenoids 21. The armatures 54 of the latter solenoids are, therefore, retracted, causing the links 55 to be pulled and the wire fingers 41 of the gates 22 to be spread apart on the pivots 42. Arms 56 on the shafts of said pivots being pulled by said links 55.

In the above-described automatic manner, a piece of fruit F is properly presented for severing of its stem, held temporarily in severing position and then released so the severed fruit may proceed along the path provided for it in the tube 10 and any continuing conduit leading to a collecting receptacle.

The means 23 is shown as a line 57 that conducts pressure air to the pistol grip 33, a normally closed valve 58 connected to said line and controlled by a push button 59, and a line 60 leading from said valve to a nozzle 61 that is disposed above the plate 29 and is directed to blow foliage away from the stem-severing area. The button 59 is shown as controlling a spool valve 62 that, when the button is pushed, opens line 60 to line 57. A spring 63 closes the valve when the button is released.

A cover 64 is preferably provided to enclose the parts that are mounted on the plate 29, the front edge 65 of said cover, as indicated by the double dot-dash line, is formed to expose the cutter and allow the stem S to reach severing position.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. An automatic fruitpicker head comprising:
    (a) a fruit-receiving tube provided with an open end having a restricted leadin slot for receiving only the stem of a piece of fruit entering the tube, said slot extending lengthwise of the tube from the open end thereof,
    (b) means to sever said stem adjacent said slot, and
    (c) means controlled by the stem, as it moves rearwardly along said slot toward the severing means, to operate the latter to cut the stems at the portions thereof extending through the slot.

2. A picker head according to claim 1 in which:
    (a) an embossment is provided in the tube at the end of the slot to engage in the cleft of said piece of fruit from which the stem thereof extends, and
    (b) the severing means includes a curved blade fitting in the embossment to cut across the stem in said cleft and below the surface of the fruit surrounding the cleft.

3. A picker head according to claim 2 provided with means to resiliently bias the fruit toward the embossment.

4. An automatic fruitpicker head comprising:
    (a) a fruit-receiving tube having a rearwardly sloping forward edge with a leadin slot in the rearward portion of said edge for the stem of a piece of fruit entering the tube,
    (b) means to sever said stem,
    (c) means controlled by the stem, as it moves rearwardly along said slot toward the severing means to operate the latter,
    (d) means to resiliently bias the fruit in a direction toward the stem-severing means, and
    (e) means to center the fruit in the tube.

5. An automatic fruitpicker head comprising:
    (a) a fruit-receiving tube having a rearwardly sloping forward edge with a leadin slot in the rearward portion of said edge for the stem of a piece of fruit entering the tube,
    (b) means to sever said stem,
    (c) means controlled by the stem, as it moves rearwardly along said slot toward the severing means to operate the latter,
    (d) pivotally mounted gate means in normally closed, fruit-intercepting position in the path of movement of a piece of fruit longitudinally into the tube, and
    (e) means operated by the stem-operated means to open said gate means to allow passage of fruit after severance of the stem thereof.

6. A picker head according to claim 5 in which bulges are provided on each side of the tube, the gate means, when opened, being largely housed in said bulges to clear the path of movement for the fruit.

7. An automatic fruitpicker head comprising:
    (a) a fruit-receiving tube having a rearwardly sloping forward edge with a leadin slot in the rearward portion of said edge for the stem of a piece of fruit entering the tube,
    (b) means to sever said stem,
    (c) means controlled by the stem, as it moves rearwardly along said slot toward the severing means to operate the latter,
    (d) pivotally mounted gate means in normally closed, fruit-intercepting position in the path of movement of a piece of fruit longitudinally into the tube,
    (e) means operated by the stem-operated means to open said gate means to allow passage of fruit after severance of the stem thereof, and
    (f) means to clear the foliage from the area adjacent to the stem that is being severed.

8. A picker head according to claim 7 in which:
    (a) the last-mentioned means comprises a tube terminating in a nozzle to conduct pressure air to said area through said nozzle, and
    (b) a finger-actuated and normally closed valve to control air flow to said nozzle.

9. A picker head according to claim 8 in which a pistol grip is affixed to the tube adjacent the end thereof and rearward of the forwardly extending open portion, the valve being embodied in said grip and the latter having a valve-opening push button extending from the grip.

References Cited

UNITED STATES PATENTS

| | | | |
|---|---|---|---|
| 2,288,682 | 7/1942 | Chittenden | 56—334 |
| 2,346,986 | 4/1944 | Metzger | 56—335 |
| 2,746,232 | 5/1956 | Ossino | 56—336 |
| 2,990,669 | 7/1961 | Klemm | 56—334 |
| 3,165,880 | 1/1965 | Buie | 56—336 |
| 3,306,019 | 2/1967 | MacCurdy | 56—332 |

ABRAHAM G. STONE, *Primary Examiner.*

P. A. RAZZANO, *Assistant Examiner.*